June 30, 1931.  F. W. SPENCER  1,812,221
DRILL CHUCK
Filed June 21, 1929
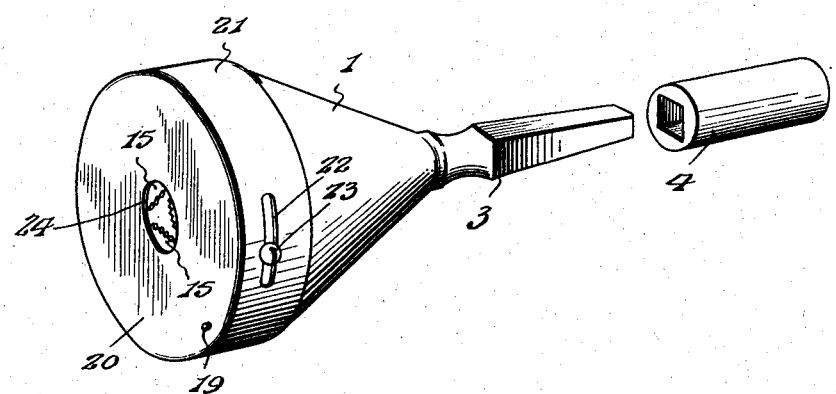
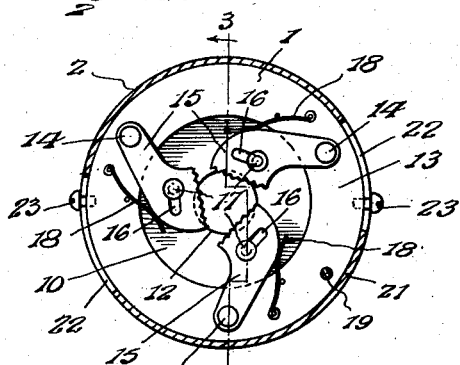
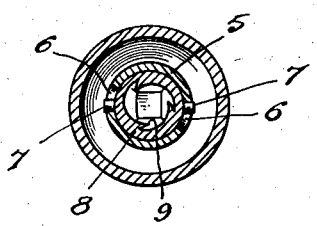
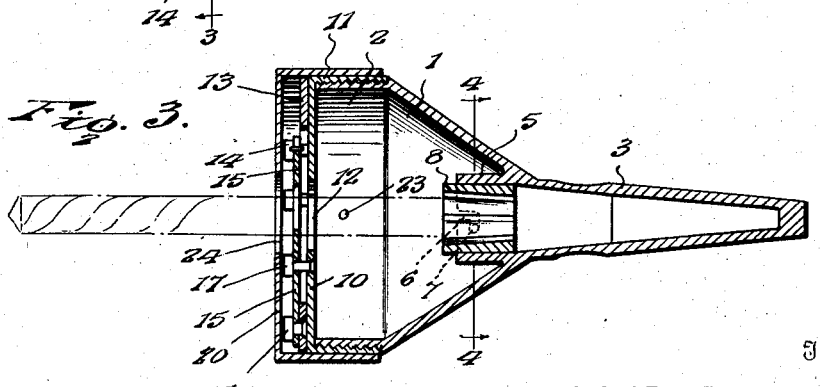
Inventor
F. W. Spencer.
By Lacey & Lacey, Attorneys Patented June 30, 1931

1,812,221

UNITED STATES PATENT OFFICE

FREDERICK W. SPENCER, OF CHICAGO, ILLINOIS

DRILL CHUCK

Application filed June 21, 1929. Serial No. 372,698.

This invention relates to tools and more particularly to a chuck adapted to be used in connection with a brace and by means of which a bit having either a round or a squared shank may be firmly held.

One object of the invention is to provide a chuck which may be engaged in the bit-receiving socket of a brace of an ordinary construction and so constructed that a bit or drill having a shank of either a round or squared construction very firmly held and caused to rotate properly when in use.

Another object of the invention is to provide the chuck with bit-engaging jaws which may accommodate themselves to the diameter of the shank of a bit fitted into the chuck and firmly grip either a thick or thin bit shank.

Another object of the invention is to provide a bit-holding chuck having actuating means for its bit-engaging jaws which may be very easily moved to adjust the jaws and will firmly hold the jaws in an adjusted position. While it is stated that the chuck is for use in connection with a bit, it will be understood that it could also be applied to a lathe in order to connect a drill or similar tool with the rotating spindle of the lathe.

The invention is illustrated in the accompanying drawings, wherein

Figure 1 is a perspective view of the improved chuck,

Fig. 2 is a transverse sectional view through the chuck,

Fig. 3 is a longitudinal sectional view through the chuck taken on the line 3—3 of Fig. 2, and Fig. 4 is a transverse sectional view taken on the line 4—4 of Fig. 3.

The casing 1 or body portion of the chuck has its forward portion 2 of an even diameter and externally threaded and this casing preferably tapers rearwardly and merges into a shank 3 which tapers toward its free end and is formed with flat side faces so that it may be fitted into the socket 4 of a brace or lathe spindle and caused to rotate with the socket. A neck 5 is formed in the inner end portion of the body or casing 1 at its junction with the shank 3, and this neck is provided with bayonet slots 6 preferably disposed in opposed relation to each other and adapted to receive pins 7 projecting from a socket 8. By this arrangement the socket may be removably secured in the casing and firmly held when in place. This socket has the inner faces of its walls cut, as shown in Fig. 4, to form teeth 9 which extend longitudinally of the socket and these teeth are adapted to bear against flat faces of a bit shank near the rear end thereof or bite into a circular bit shank and thereby cause the rear end of the shank to be firmly gripped and held against rotation in the socket.

The outer or forward end of the casing is closed by a head 10 having an internally threaded wall 11 which is screwed upon the externally threaded forward end portion of the casing and this head is formed with a central opening 12 of sufficient size to permit either a squared or circular bit shank to be passed through it. A ring 13 fits against the outer face of the head and from this ring extend pins 14 upon which are pivotally mounted jaws 15 which extend inwardly towards the opening 12 and terminate in enlarged heads having slots 16 formed therein through which pass pins 17 carried by the head 10. Springs 18 urge the free ends of the jaws toward each other and these free ends are serrated to form teeth so that the jaws may firmly grip a bit shank passed between the jaws and inwardly through the opening 12 into the casing.

The jaws are moved about their pivots toward and away from each other by rotating the ring 13, and in order to rotate this ring, there has been provided a pin 19 which extends outwardly therefrom and passes through an opening formed in a cap 20 which fits about the head and outer end of the casing and has its annular wall 21 formed with circumferentially extending slots 22 through which pass screws 23 serving to retain the cap in place and limit rotary movement thereof. By grasping the cap and rotating it the ring will be rotated with it and as the ring moves the jaws will be swung either toward or away from each other according to the direction in which the cap is turned. Therefore, the jaws may be very easily swung into position to firmly grip the shank of a bit or move out of engagement with it and there will be no danger of the jaws not properly gripping the bit shank as they cannot move toward a releasing position until the cap is turned. An opening 24 is formed centrally in the cap opposite the opening 12 so that the shank of a bit may be passed through the cap and head into the casing. If it is found that the rear end of a circular bit shank cannot be properly engaged in the socket 8, the head and cap can be detached from the casing and the socket removed, thereby allowing the rear end of the bit shank to be directly received in the neck 5 or if necessary thrust into the hollow neck 3.

I have, therefore, provided a chuck adapted to receive a bit having either a round or square shank and by means of which the bit may be very firmly held and prevented from turning in the chuck.

Having thus described the invention, I claim:

1. A chuck comprising a hollow body, a shank extending rearwardly from said body, a seat in said body to receive the rear end of a bit, a head for the front end of said body formed with a central opening, a ring fitting against said head, jaws pivoted to said ring and extending towards said opening and pivotally and slidably connected with said head for movement towards and away from the opening as the ring is rotated, means between the ring and opening to guide movement of the jaws, and means to rotate said ring.

2. A chuck comprising a hollow body, a shank extending rearwardly from said body, a head for the front end of said body formed with a central opening, a ring fitting against said head and rotatable circumferentially thereof, the ring being disposed about the opening in spaced concentric relation thereto, jaws pivoted to said ring and extending towards said opening and having their free end portions formed with transverse slots, pins extending from said head between the ring and opening and engaged through the slots of the jaws to guide movement thereof towards and away from the opening as the ring is rotated, resilient means urging said jaws towards the opening, and means to rotate said ring.

3. A chuck comprising a hollow body, a shank extending rearwardly from said body, a seat in said body to receive the rear end of a bit, a head for the front end of said body formed with a central opening, a ring fitting against said head and rotatable circumferentially thereof, jaws pivoted to said ring and extending towards said opening and pivotally and slidably connected with said head between the ring and opening for movement towards and away from the opening as the ring is rotated, a cap covering said ring and jaws and rotatable about the body, means to limit rotary motion of the cap, and a pin extending from said ring through said cap to cause the ring to be rotated and adjust the jaws when the cap is turned.

4. A chuck comprising a hollow body, a shank extending rearwardly from said body, a head for the front end of said body formed with a central opening and having an annular wall fitting about the body, a ring fitting against the outer face of said head and rotatable, jaws pivoted to said ring and extending towards the opening and pivotally and slidably connected with the head, a cap covering the head and having an annular fitting about the wall of the head and formed with a circumferentially extending slot, a fastener passed through the slot and wall of said head into said body to retain the head in place and limit turning of the cap, and a pin extending from said ring through said cap whereby the ring will be turned with the cap and the jaws moved into and out of position to grip a bit passed through the cap and head into the body.

In testimony whereof I affix my signature.

FREDERICK W. SPENCER [L. s.]